United States Patent [19]

Ishikawa et al.

[11] Patent Number: 5,655,919

[45] Date of Patent: Aug. 12, 1997

[54] ELECTRIC CONNECTION DEVICE INTERPOSED BETWEEN HANDLE AND STEERING COLUMN OF AUTOMOTIVE VEHICLE

[75] Inventors: Satoshi Ishikawa; Nobuhiko Suzuki, both of Shizuoka-ken, Japan

[73] Assignee: Yazaki Corporation, Tokyo, Japan

[21] Appl. No.: 522,448

[22] Filed: Aug. 31, 1995

[30] Foreign Application Priority Data

Sep. 2, 1994 [JP] Japan .................... 6-209850

[51] Int. Cl.⁶ .................................. H01R 39/00
[52] U.S. Cl. .............................. 439/164; 439/15
[58] Field of Search .................... 439/164, 15, 16

[56] References Cited

U.S. PATENT DOCUMENTS 5,259,775  11/1993  Kubota et al. .................. 439/15

FOREIGN PATENT DOCUMENTS

| 04419077 | 12/1994 | European Pat. Off. .......... 429/164 |
| 1-954760 | 4/1989 | Japan . |
| 2-121360 | 10/1990 | Japan . |
| 5-207632 | 8/1993 | Japan . |

*Primary Examiner*—Neil Abrams
*Assistant Examiner*—Eugene G. Byrd
*Attorney, Agent, or Firm*—Finnegan, Henderson, Farabow, Garrett & Dunner, L.L.P.

[57] ABSTRACT

An electric connection device interposed between a steering wheel and a steering column, comprising: a rotary body fixed to the steering wheel; a device housing fixed to the steering column; an internal gear fixed to the device housing; an annular flat cable carrier rotatably disposed in an annular space formed in the device housing; a plurality of planetary gears in mesh between an outer gear portion of the rotary body and an inner gear portion of the internal gear; a plurality of rollers mounted on the annular flat cable carrier; and a flexible flat cable connected between the rotary body and the device housing and arranged in the annular space of the device housing. Whenever the rotary body is rotated in either direction, the flexible flat cable is first reeled around the rotary body, reversed around one of the rollers at a reversal portion thereof, and then wound around the internal gear. In particular, since the annular flat cable carrier is formed with a space under the reversal portion of the flexible flat cable for prevention of the flexible flat cable from being slid in contact with the annular flat cable carrier in a radial direction thereof, it is possible to prevent abnormal noise from being generated from the device.

13 Claims, 5 Drawing Sheets

5,655,919

ELECTRIC CONNECTION DEVICE INTERPOSED BETWEEN HANDLE AND STEERING COLUMN OF AUTOMOTIVE VEHICLE

BACKGROUND OF THE INVENTION

1. Technical Field

The present invention relates to an electric connection device interposed between a handle (steering wheel) and a steering column for an automotive vehicle, and more specifically to an electric connection device for transmitting various control signals from switches mounted on a steering wheel to a controller, for instance through the steering column.

2. Description of the Prior Art

With the advance of electronic control in the field of automotive vehicles, a number of control switches are arranged on a steering wheel (i.e., handle) of an automotive vehicle to execute various controls of the automotive vehicle. In this case, since the steering wheel is usually rotated by a few turns in both clockwise and counterclockwise directions, a flexible flat cable (FFC) having a plurality of conductive wires therein are connected between a rotary body fixed to a handle shaft and a device housing fixed to the steering column, so that electric signals of the control switches can be transmitted from the steering wheel to the other side of the automotive vehicle through the steering column. Further, when interposed between the steering wheel and the steering column, the flexible flat cable is usually housed in the device housing in a vortex state or a reversal vortex state (the rotational direction being reversed midway in the vortex state).

In the conventional electric connection device as described above, however, there exists a problem in that an abnormal sound (noise) is generated whenever the steering wheel is rotated.

The inventors have examined and studied the reasons why the above-mentioned abnormal noise is generated whenever the steering wheel is rotated in either direction, and then found out that the abnormal noise is generated due to the sliding contact between the flexible flat cable and an annular flat cable carrier at only a reversal position at which the movement direction of the flexible flat cable is reversed in the circumferential direction of the device and thereby shifted in the radial direction of the device.

SUMMARY OF THE INVENTION

With these problem in mind, therefore, it is the object of the present invention to provide an electric connection device interposed between a steering wheel and a steering column, which will not generate any abnormal noise when the steering wheel is rotated in either direction.

To achieve the above-mentioned object, the present invention provides an electric connection device interposed between a steering wheel and a steering column, having: a rotary body (1, 3) fixed to the steering wheel and formed with an outer circumferential gear portion (25); a device housing (5, 7) fixed to the steering column; an internal gear (13) fixed to the device housing and formed with an inner circumferential gear portion (15), an annular space (9) being formed between the rotary body and the internal gear; an annular flat cable carrier (19) rotatably disposed in the annular space (9); a plurality of planetary gears (23) rotatably attached to a lower surface of the annular flat cable carrier (19) at regular angular intervals in mesh between the outer circumferential gear portion (25) of the rotary body and the inner circumferential gear portion (15) of the internal gear (13); a plurality of rollers (21) mounted on the annular flat cable carrier (19) at regular angular intervals; and a flexible flat cable (11) connected between the rotary body and the device housing and arranged in the annular space (9) and movably guided by the rollers mounted on the annular flat cable carrier. Whenever the rotary body (1, 3) is rotated, the annular flat cable carrier (19) is shifted between the inner and outer circumferential sides of the annular space, in such a way that the flexible flat cable (11) is first reeled around an outer circumferential surface of the rotary body, reversed around one (21A) of the rollers (21) at a reversal portion (11a) of the flexible flat cable (11), and then wound around an inner circumferential surface of the internal gear (13). The annular flat cable carrier (19) is formed with a space (49, 49A, 49B) under the reversal portion (11a) of the flexible flat cable (11), for prevention of the flexible flat cable from being slid in contact with the annular flat cable carrier (19) in a radial direction thereof.

Further, it is preferable that the space (49) is formed by partially cutting off the annular flat cable carrier (19) through a predetermined small sectorial angle under the reversal portion (11a) of the flexible flat cable (11).

In is also preferable that the opened small sectorial angle space (49) of the annular flat cable carrier (19) be linked by two flat link plates (45, 47) at both the radial ends of the annular flat cable carrier (19) for reinforcement of the flat cable carrier.

Further, it is preferable that the opened small sectorial angle space (49) of the annular flat cable carrier (19) is linked by a single flat link plate (48), with two washer plates (48a) sandwiched between the annular flat cable carrier (19) and the flat link plate (48), at both circumferential ends of the annular flat cable carrier (19), respectively for reinforcement of the flat cable carrier.

Finally, it is preferable that the two flat link plates (48, 47) are formed integral with the annular flat cable carrier (19), and that the single flat link plate (48) and the two washers (48a) are formed integral with the annular flat cable carrier (19).

As described above, in the electrical connection device according to the present invention, the lower surface of the flexible flat cable is shifted or slid in the radial direction, without contact with the flat cable carrier at the reversal portion of the flexible flat cable, whenever the flexible flat cable is shifted between the outer circumferential surface of the rotary body and the inner circumferential surface of the internal carrier 13, so that it is possible to prevent abnormal sound from being generated due to sliding contact between the reversal portion of the flexible flat cable and the annular flat cable carrier.

DETAILED DESCRIPTION OF THE EMBODIMENTS

With reference to the attached drawings, the electric connection device according to the present invention will be described hereinbelow in further detail.

Figure 1:
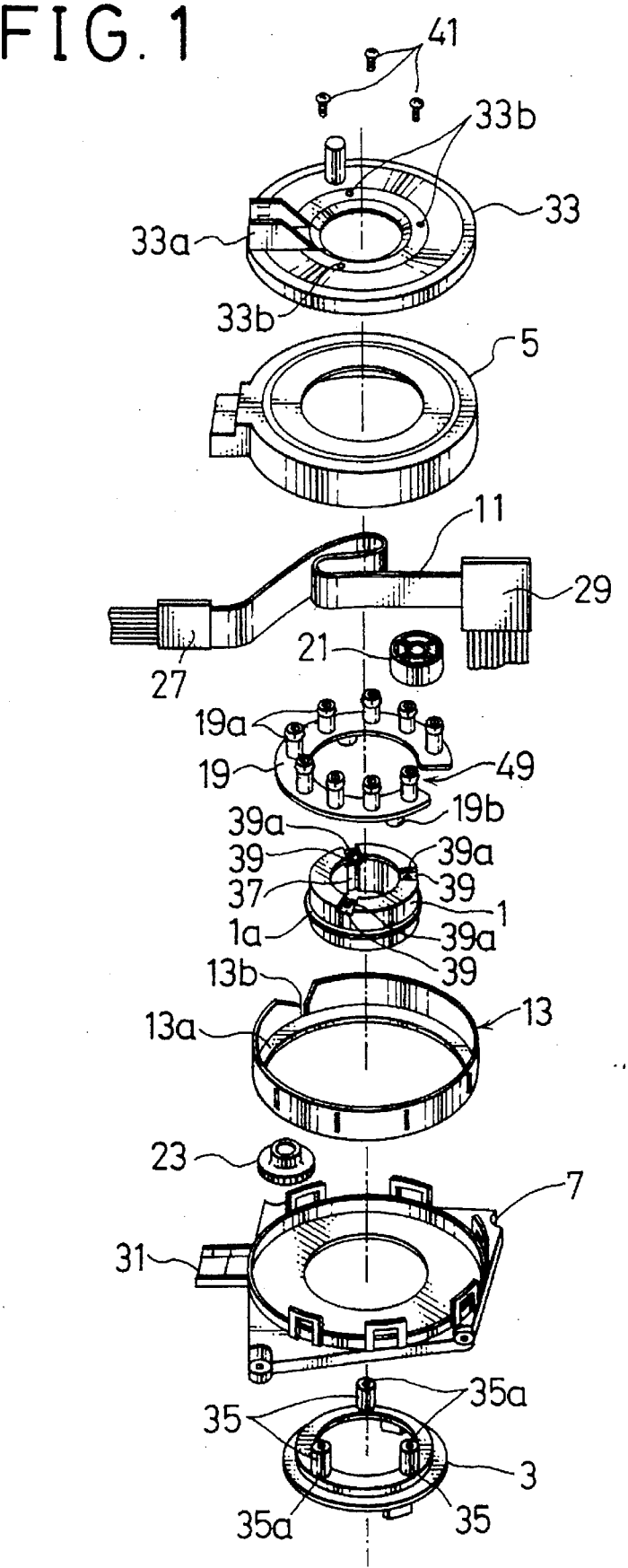
FIG. 1 is an exploded view showing the electric connection device interposed between the steering wheel and the steering column according to the present invention.

In FIG. 1, from above, the electric connection, device is roughly composed of a rotary cover 33, an upper cover 5, a flexible flat cable (referred to as FFC simply, hereinafter) 11, an annular flat cable (FFC) carrier 19 for carrying the FFC 11, a first rotary body 1, an internal gear 13, a lower cover 7, and a second rotary body 3.

Figure 2:
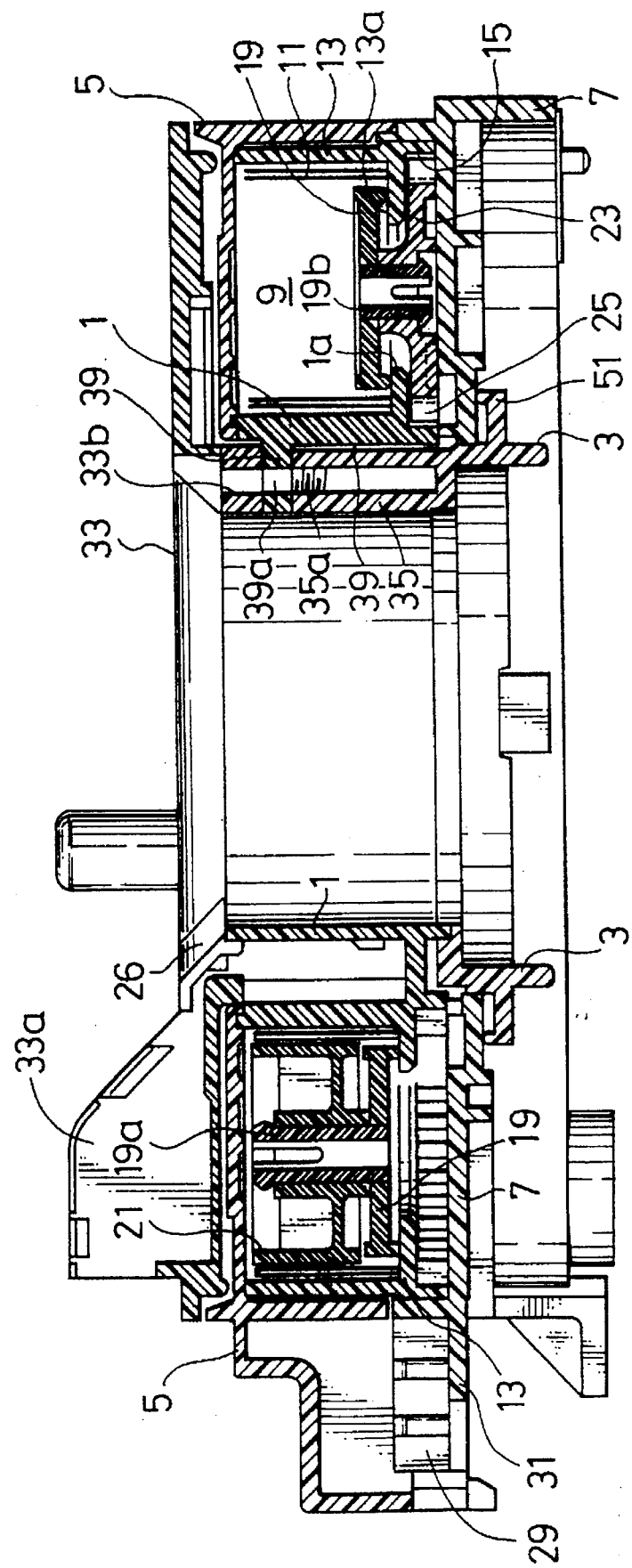
FIG. 2 is a cross-sectional view showing the electric connection device according to the present invention, taken along the line II—II in FIG. 3.

With reference to FIG. 2, the first (outer) cylindrical rotary body 1 and the second (inner) cylindrical rotary body 3 are both fixed to each other and are sometimes referred to as a rotary body (1, 3). Further, the upper cover 8 and the lower cover 7 are sometimes referred to as a device housing (5, 7).

A steering wheel (i.e., handle) (not shown) is inserted into the second cylindrical rotary body 3 fixed to the first rotary body 1. Further, the device housing (5, 7) is fixed to a steering column (not shown). Further, the first rotary body 1 is covered by the upper cover 5 and the lower cover 7, respectively.

The first rotary body 1 is formed with an outer flange portion 1a and an outer gear portion 25. Further, the internal gear 13 is formed with an inner flange portion 13a and an inner gear portion 15.

Further, the FFC 11 having a plurality of conductive wires is housed in an annular space 9 formed between the rotary body (composed of the first and second rotary bodies 1 and 3) and the internal gear 13 covered by the device housing (composed of the upper cover 5 and the lower cover 7).

Further, as shown in FIG. 2, the internal gear 13 is fixed to the device housing (5, 7) to support the bottom surfaces of the outer circumferential portion of the FFC 11, respectively. The internal gear 13 is formed with an inner gear portion 15 on the lower side and inner circumferential surface thereof.

Here, the annular FFC carrier 19 is rotatably supported by the outer flange portion 1a of the first rotary body 1 and the inner flange portion 13a of the internal gear 13 within an annular space formed between the first rotary body 1 and the internal gear 13, in such a way as to be slidable in the circumferential direction thereof.

In addition, three downward projecting pins 19b (See FIG. 1) are arranged at regular angular intervals of the annular FFC carrier 19, and three planetary gears 23 are rotatably supported by these pins 19b, respectively. These three planetary gears 23 are in mesh between the outer gear portion 25 of the first rotary body 1 and the inner gear portion 15 of the internal gear 13 at regular angular intervals.

Therefore, when the rotary body (composed of the first and second rotary bodies 1 and 3) is rotated (by the steering wheel shaft (not shown)), the three planetary gears 23 also rotate around their own axes, respectively and further around the rotary body (1, 3) at a predetermined reduction gear ratio relative to the rotary body (1, 3), so that the annular flat cable carrier 19 is also rotated in the same direction as that of the rotary body (1, 3).

As shown in FIG. 1, on the annular FFC carrier 19, a plurality of upward projecting pins 19a are arranged at regular angular intervals thereof, and a plurality of guide rollers 21 are rotatably fitted to the upward projecting pins 19a, respectively, so that the FFC 11 can be rotatably guided along these guide rollers 21.

Figure 3:
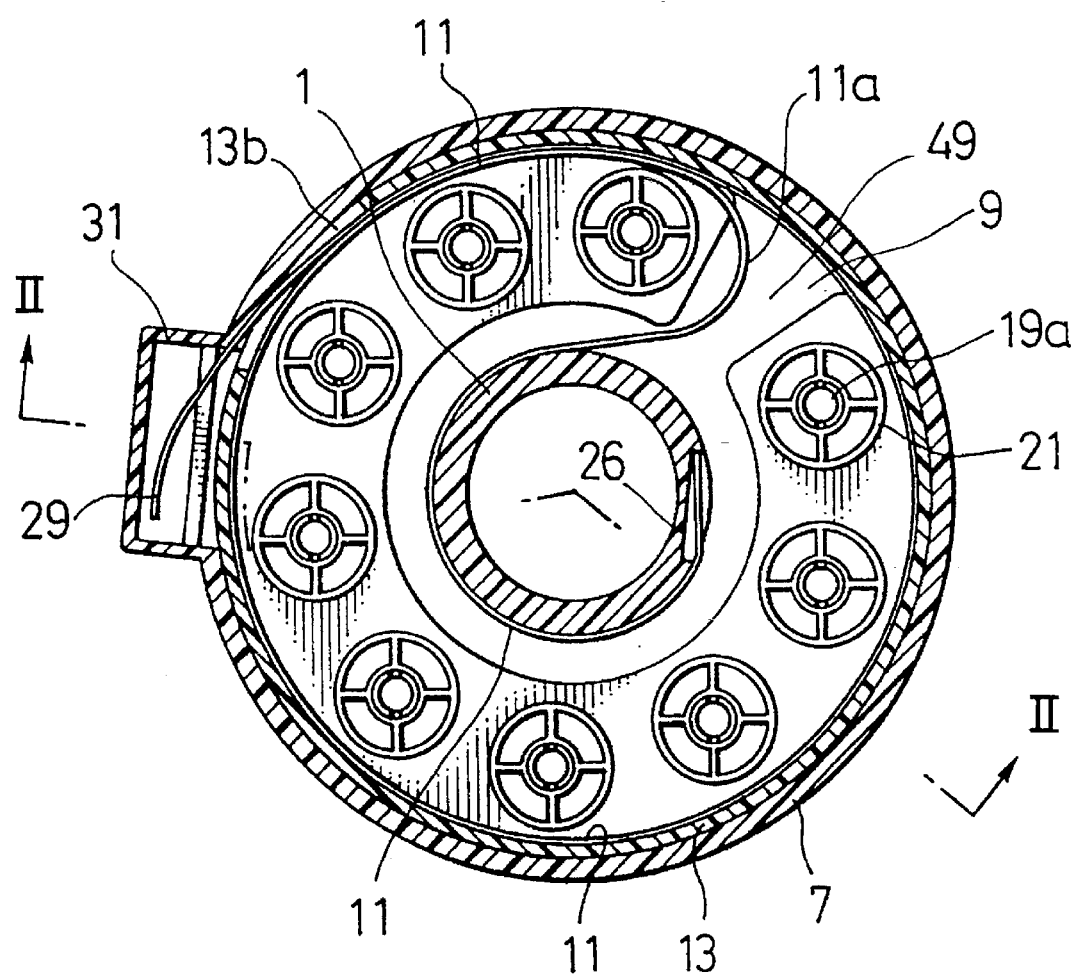
FIG. 3 is a plane view showing of the electric connection device according to the present invention, in which the reversal vortex flexible flat cable is shown.

As shown by a dashed line in FIG. 3, one inner end of the FFC 11 is first fixed to a fixing portion 26 of the first rotary body 1 and then connected to an inner connector 27 fixed to an inner connector fixing portion 33a of the rotary cover 33 (both shown in FIG. 1). On the other hand, an outer end of the FFC 11 is connected to an outer connector 29 fixed to an expanded portion 31 of the lower cover 7 (both shown in FIG. 1).

With reference to FIG. 3, the FFC 11 extends from the inner end (the connector 27) to the outer end (the connector 29) in such a way as to be first wound around and along the outer circumferential surface of the rotary body 1 in a first (e.g., clockwise) direction, reversed at a reversal portion 11a (being wound around one (21A) of the guide rollers 21), wound again around and along the inner circumferential surface of the internal gear 13 in a second (e.g., counterclockwise) direction (opposite to the first direction) by a few turns, and taken out of the device housing (5, 7) through a cutout portion 13b (shown in FIGS. 1 and 3) of the internal gear 13.

Further, the rotary cover 33 is fixed to the two rotary bodies 1 and 3 so as to cover the upper cover 5, as shown in FIG. 2. The inner connector 27 of the FFC 11 is fixed to a connector fixing portion 33a formed on the rotary cover 33, as shown in FIG. 1. On the other hand, the outer connector 29 is fixed to the expanded portion 31 of the lower cover 7, as already explained.

The FFC 11 is long enough to extend for the several turns of the steering handle.

Further, as shown in FIGS. 1 and 2, the rotary cover 33 is formed with three screw holes 33b. The second rotary body 3 is formed with three upward projecting boss portions 35 at such positions as to match the three screw holes 33b, respectively. These boss portions 35 are inserted into three upward insertion grooves 37 of the first rotary body 1 so that the upper ends of the boss portions 35 are brought into contact with the lower surface of the flange portion 39 of the first rotary body 1. In the flange portion 39, three screw holes 39a are formed at such positions as to match the three screw holes 33b. Therefore, when three screws 41 (shown in FIG. 1) are screwed into the three screw holes 33b of the rotary cover 33, three screw holes 39a of the flange portion 39 of the first rotary body 1, and the three screw holes 35a of the three boss portions 35 of the second rotary body 3, it is possible to fix the rotary cover 33 to the first and second rotary bodies 1 and 3 at the same time.

In operation, when the rotary body (1 and 3) is rotated clockwise in FIG. 3, for instance, the FFC 11 wound around the outer circumference of the first rotary body 1 is loosened and therefore reeled off from the first rotary body 1, and is gradually wound around the inner circumferential surface of the internal gear 13. The reversal portion 11a of the FFC 11 is also shifted in the same clockwise direction together with the guide rollers 21A and 21 mounted on the annular FFC carrier 19 via the planetary gears 23.

On the other hand, when the rotary body (1, 3) is rotated counterclockwise in FIG. 3, the FFC 11 wound around the inner circumference of the internal gear 13 is loosened and therefore reeled off from the internal gear 13 and further gradually wound around the outer circumferential surface of the first rotary body 1. The reversal portion 11a of the FFC 11 is also shifted in the same counterclockwise direction together with the guide rollers 21A and 21 mounted on the annular FFC carrier 19 via the planetary gears 23.

In the above-mentioned operation, since the annular FFC carrier 19 is also rotated in the same direction as that of the rotary body (1, 3), the FFC 11 can be guided by the guide rollers 21A mounted on the annular FFC carrier 19. In this case, the reversal portion 11a of the FFC 11 is shifted in the circumferential direction together with the guide rollers 21 mounted on the annular FFC carrier 19, within the annular space 9 (formed between the rotary body (1 and 3) and the device housing (5 and 7)). However, it should be noted that whenever the FFC 11 is shifted in the circumferential direction by the annular FFC carrier 19, the reversal portion 11a of the FCC 11 is also shifted in the radial direction within the same annular space 9.

The inventors have found that abnormal noise is generated from the reversal portion 11a of the FFC 11 shifted in the radial direction of the annular FFC carrier 19, whenever the steering wheel is rotated in either direction. Specifically, when the FFC 11 is shifted from the outer circumferential side (the internal gear 13) to the inner circumferential side (the rotary body 1, 3) of the annular space 9 or vice versa, the bottom surface 11b(shown in FIG. 4B) of the semi-circular portions (a, b and c) (shown in FIG. 4A) at the reversal portion 11a of the FFC 11 is slid in contact with the outer surface of the annular FFC carrier 19, so that abnormal sound is generated. To overcome this problem, in the present invention, the annular FFC carrier 19 is cut in such a way that a space 49 can be formed under the reversal portion 11a of the FFC 11, that is, near the roller 21A shown in FIGS. 1 and 3. In the basic embodiment shown in FIG. 3, the space 49 is partially formed by cutting off the annular FFC carrier 19 through a predetermined small sectorial angle at the reversal portion 11a thereof, so that the reversal portion 11a of the FFC 11 can be shifted or slid without contact with the annular FFC carrier 19. In other words, therefore, the feature of the present invention is to provide an electric connection device, by which abnormal sound generated at the reversal portion 11a of the FFC 11 can be eliminated, when the FFC 11 is shifted radially between the outer circumferential surface of the rotary body (1, 3) and the inner circumferential surface of the internal gear 13, by forming a space under the reversal portion 11a of the FFC 11, without allowing the reversal portion 11a of the FFC 11 to be brought into contact with the upper surface of the annular FFC carrier 19.

In the above-mentioned embodiment, as shown in FIG. 2, the FFC 11 is reeled up or off within a radially inner space (formed between the outer circumferential surface of the first rotary body 1 and the internal circumferential surface of the annular FFC carrier 19) and a radially outer space (formed between the outer circumferential surface of the annular FFC carrier 19 and the internal circumferential surface of the internal gear 13). As a result, the lower end surface 11b of the FFC 11 is supported by the flange portion 1a of the first rotary body 1 and the flange portion 13a of the internal gear 13, respectively.

Figure 4A:
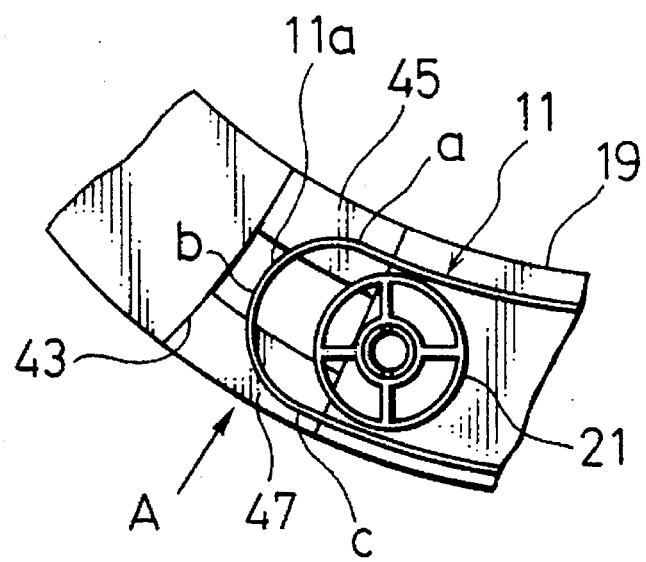
FIG. 4A is an enlarged plane view showing only the reversal portion of the flexible flat cable of the electric connection device according to a first modification of the present invention.
Figure 4B:
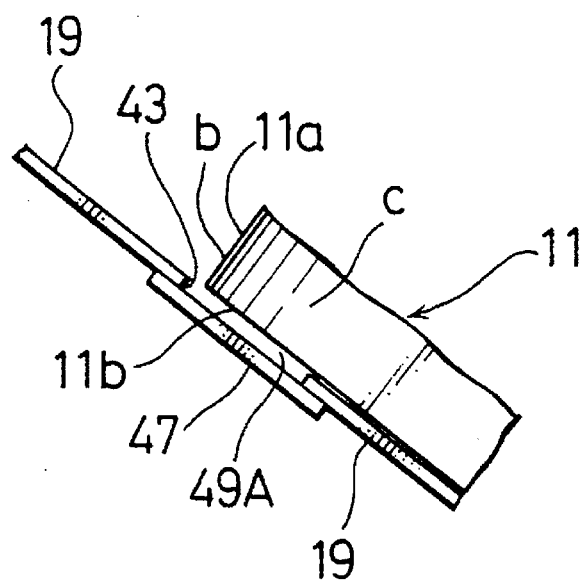
FIG. 4B is an enlarged side view of the reversal portion of the flexible flat cable as seen from direction A in FIG. 4A.
Figure 5:
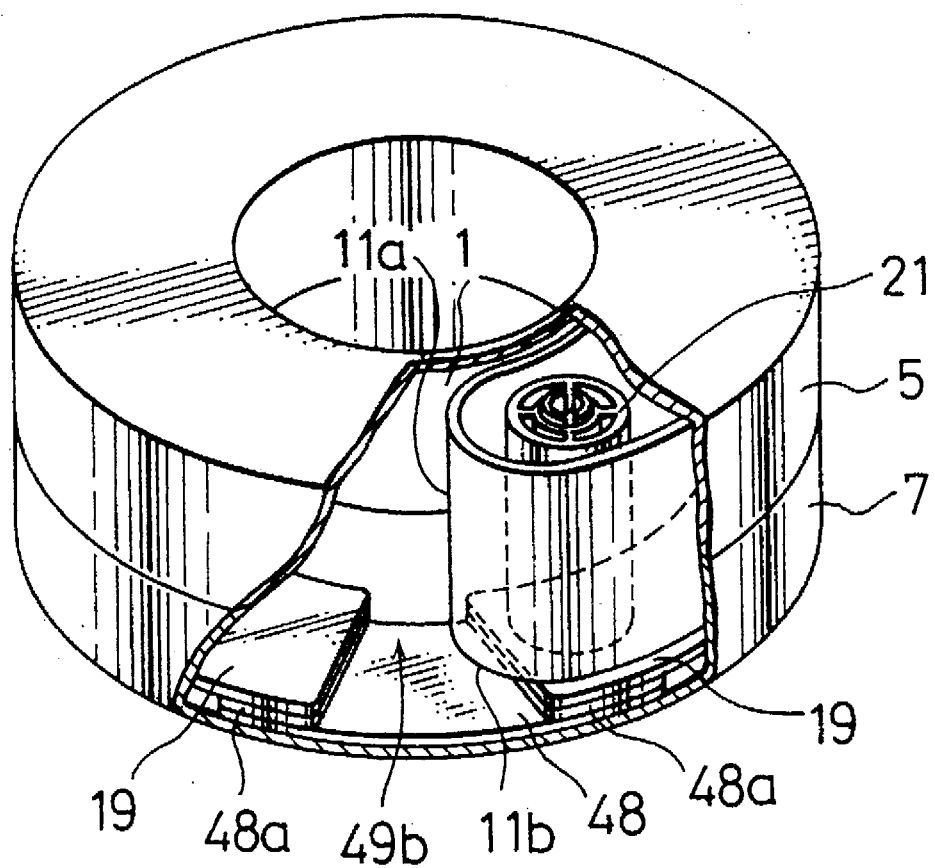
FIG. 5 is a diagrammatical broken perspective view showing the reversal portion of the flexible flat cable of a second modification of the electric connection device.

Without being limited only thereto, it is also possible to support the FFC 11 directly by the annular FFC carrier 19, as shown in FIGS. 4A and 4B and FIG. 5. In this case, after the annular FFC carrier 19 has been partially cut away through a predetermined small sectorial angle at such a position where the reversal portion 11a of the FFC 11 is located (in the same way as with the case shown in FIG. 3), two link plates 45 and 47 are attached to both radial ends of the cutout portion 43, so that a space 49A can be formed under the lower surface 11b of the semi-circular portion a, b and c at the reversal portion 11a of the FFC 11, as shown in FIGS. 4A and 4B. In this first modification, since the annular FFC carrier 19 can be reinforced by the two link plates 45 and 47, when the electrical connection device is mounted on the vehicle, it preferably absorbs the vibration applied to the vehicle.

Further, FIG. 5 shows a second modification, in which the two link plates 45 and 47 can be replaced with a single link plate 48. In this second modification, two washer plates 48a are sandwiched between the annular FFC carrier 19 and the link plate 48 in order to provide a sufficient space under the lower surface portion 11b of the semicircular portion b (the outermost end portion) at the reversal portion 11a of the FFC 11.

Further, in the above-mentioned first and second modifications, the link plates 45, 47 and 48 and the washer plate 48a can be easily formed integral with the annular FFC carrier 19.

In the electrical connection device according to the present invention, when the rotary body (1, 3) is rotated clockwise or counterclockwise, since the FFC 11 is reeled gradually around the outer circumferential surface of the rotary body (1, 3). In this case, since the annular FFC carrier 19 and the guide rollers 21 mounted on the annular FFC carrier 19 are also rotated in the same direction of the rotary body at a predetermined reduction gear ratio relative to the rotary body via the planetary gears 23, the reversal portion 11a of the FFC 11 is also rotated in the same direction, so that the reversal portion 11a is inevitably shifted in the radial direction from the inner circumferential side to the outer circumferential side or vice versa within the annular space 9 of the device housing (5, 7). In the radial shift motion of the FFC 11 simultaneously caused whenever the FFC 11 is moved in the circumferential direction of the guide rollers 21, since the lower end surface 11b of the reversal portion 11a of the FFC 11 will not slid in contact with the upper surface of the annular FFC carrier 19, it is possible to prevent abnormal noise from being generated, with the result that the FFC 11 can be smoothly reeled around both the rotary body (1, 3) and the internal gear 13.

As described above, in the electrical connection device according to the present invention, the lower surface of the flexible flat cable is shifted or slid in the radial direction, without contact with the flat cable carrier at the reversal portion of the flexible flat cable, whenever the flexible flat cable is shifted between the outer circumferential surface of the rotary body and the inner circumferential surface of the internal carrier 13. It is thus possible to prevent abnormal sound from being generated due to sliding contact between the reversal portion of the flexible flat cable and the annular flat cable carrier.

What is claimed is:

1. An electric connection device interposed between a steering wheel and a steering column, comprising:
   a rotary body fixed to the steering wheel and formed with an outer circumferential gear portion;
   a device housing fixed to the steering column;
   an internal gear fixed to the device housing and formed with an inner circumferential gear portion, wherein an annular space is formed between the rotary body and the internal gear;
   an annular flat cable carrier rotatably disposed in the annular space;

a plurality of annular gears rotatably attached to a lower surface of the annular flat cable carrier at regular intervals intermeshing with the outer circumferential gear portion of the rotary body and the inner circumferential gear portion of the internal gear;

a plurality of rollers mounted on the annular flat cable carrier at regular angular intervals; and a flexible flat cable connected between the rotary body and the device housing and arranged in the annular space, the flexible cable being movably guided by the rollers mounted on the annular flat cable carrier whenever the rotary body is rotated, the annular flat cable carrier being shifted between the inner and outer circumferential sides of the annular space, in such a way that the flexible flat cable is first reeled around an outer circumferential surface of the rotary body, reversed around one of the rollers at a reversal portion of the flexible flat cable, and then wound around an inner circumferential surface of the internal gear, wherein the annular flat cable carrier is formed with a space under the reversal portion of the flexible flat cable for preventing the flexible flat cable from being slid in contact with the annular flat cable carrier in a radial direction thereof.

2. The electric connection device of claim 1, wherein the space is formed by partially cutting off the annular flat cable carrier through a predetermined small sectional angle under the reversal portion of the flexible flat cable.

3. The electric connection device of claim 2, wherein the small sectional angle space of the annular flat cable carrier is linked by two flat link plates at both radial ends of the annular flat cable carrier for reinforcement of the flat cable carrier.

4. The electric connection device of claim 2, wherein the small sectional angle space of the annular flat cable carrier is linked by a single flat link plate, with two washer plates sandwiched between the annular flat cable carrier and the flat link plate, at both circumferential ends of the annular flat cable carrier, respectively, for reinforcement of the flat cable carrier.

5. The electric connection device of claim 2, wherein the two flat link plates are formed integral with the annular flat cable carrier.

6. The electric connection device of claim 4, wherein the single flat link plate and the two washers are integrally formed with the annular flat cable carrier.

7. An electric connection device interposed between a steering wheel and a steering column, comprising:

a housing integral with the steering column;

an integral gear member fitted in the housing, the internal gear member having an inner circumferential gear portion;

a rotary body integrally rotatable with the steering wheel, the rotary body having an outer circumferential gear portion, wherein the rotary body cooperates with the internal gear member to define an annular space therebetween;

a flexible flat cable disposed in the annular space and having an inner end secured to the rotary body and an outer end secured, through the internal gear member, to the housing, the flexible flat cable spirally extending around the rotary body and along the internal gear member, and having therebetween a shifting reverse portion including a reversal section, wherein the flexible flat cable moves in a substantially radial direction of the annular space; and a cable carrier assembly, rotatably arranged in the annular space, for carrying the shifting reverse portion of the flexible flat cable, the cable carrier assembly comprising:

a carrier member having a pair of upper surfaces, cooperative with each other, for slidably supporting the shifting reverse portion of the flexible flat cable, the pair of upper surfaces being separated from each other such that a space is defined therebetween, a planetary gear rotatably secured to a lower surface of the carrier member, the planetary gear intermeshing between the outer circumferential gear portion of the rotary body and the inner circumferential gear portion of the internal gear member, and a pair of guide rollers mounted on one of the pair of upper surfaces of the carrier member for guiding and shifting the reverse portion of the flexible flat cable, such that the length of the reversal section is substantially along the space between the pair of upper surfaces.

8. The electric connection device of claim 7, wherein the carrier member further comprises an annular flat plate having a substantially C-shaped configuration with a pair of mutually opposing end parts formed with one of the pair of upper surfaces.

9. The electric connection device of claim 8, wherein the carrier member further comprises a linkage means for increasing a rigidity of the substantially C-shaped configuration.

10. The electric connection device of claim 9, wherein the linkage means comprises radially inner and outer links for interconnecting the pair of mutually opposing end parts.

11. The electric connection device of claim 10, wherein the inner and outer link plates are integrally formed with the annular flat plate.

12. The electric connection device of claim 9, wherein the linkage means comprises a pair of distance members fixed to one of the mutually opposing end parts, and a link member interconnecting the pair of distance members.

13. The electric connection device of claim 12, wherein the pair of distance members and the link member are integrally formed with the annular flat plate.

* * * * *